Patented Oct. 11, 1927.

1,645,126

UNITED STATES PATENT OFFICE.

VERE B. BROWNE, OF TARENTUM, PENNSYLVANIA

PROCESS OF PREPARING LOW-CARBON ALLOYS.

No Drawing. Application filed January 9, 1923, Serial No. 611,644. Renewed February 24, 1927.

This invention relates to the preparation of low-carbon ferro-alloys in the electric furnace, and comprises a novel process whereby alloys of such metals as chromium, manganese and the like which are characterized by a high degree of affinity for carbon, may be regularly prepared with very low carbon content, (below about 0.1 percent carbon) in an electric furnace of the arc type employing carbon electrodes. My process will be described with specific reference to the production of the alloy known as "rustless iron," and containing upward of 12 percent of chromium associated with not more than about 0.1 percent of carbon, the balance principally iron: but it is likewise applicable generally to other alloys where the carbon requirements are similar, as for example the so-called manganese steels of relatively high manganese content and low carbon content.

Ferro-alloys are commonly prepared in the electric furnace by the addition of the alloying metals to a bath of molten iron which has undergone refining by means of an oxidizing slag serving to eliminate so far as practicable carbon and the metalloids, sulfur and phosphorus. Previous to the addition of the alloying metal it is customary to replace this primary or refining slag which as before mentioned is of oxidizing character, by a secondary slag of basic nature, comprising usually lime and a flux, as fluorspar; and the alloying metal, as for example chromium or low-carbon ferrochrome, is added in presence of this secondary slag. The principal function of the secondary slag is to effect deoxidation of the bath, and this is accomplished by establishing reducing conditions either by the addition of carbon (coke or electrode powder); or of non-carbon reducing agents, such as ferrosilicon, when a low-carbon product is desired. In either case however there occurs a considerable absorption of carbon by the bath, derived in the case where non-carbon reducing agents are used from the carbon vapors emanating from the arcs. It is commonly considered that these vapors react directly with the basic constituents of the slag, forming calcium carbide, which transfers carbon to the metal.

According to the present invention, in direct opposition to existing practice, I impart an oxidizing character to this secondary slag, and thereby eliminate or greatly reduce this source of contamination of the metal by carbon. I add the ferro-alloy in presence of this oxidizing slag, and preferably subject the slag, in a later operating stage, to the reducing action of a non-carbon reducing agent to reduce and recover the metals existing therein in oxidized condition.

As applied to the preparation of rustless iron containing less than 0.1 percent of carbon, I may proceed as follows:

The metal bath is refined in the usual manner by the use of an oxidizing slag, whereby the carbon, sulfur and phosphorus are eliminated as far as practicable. This slag is then removed and replaced by a slag consisting largely of lime, preferably with sufficient fluorspar to impart the necessary fluidity. To this secondary slag I add, usually in relatively small proportion, one or more metallic oxids which are not readily soluble in the molten metal and are reducible by the carbon vapors from the arc, converting this carbon into its gaseous oxids. The oxid used should be practically pure as regards components injurious to the bath, and should of course be the oxid of a metal which is not prejudicial to the particular alloy to be prepared. I may use with advantage manganese oxid, or an oxid of the alloying metal or metals, as chromic oxid when chromium is the alloying metal. Iron oxid, for example in the form of mill scale, may be used but is less desirable by reason of its relatively high solubility in the metal bath. Since the primary purpose of this reducible oxid is to react with the carbon vapors emanating from the arcs, converting them into gaseous oxids, and thereby preventing the formation of calcium carbide, it should be present in the slag in at least sufficient proportion to accomplish this result with speed and certainty; that is to say, it should be present in decided excess of the actual equivalent of the carbon vapors contacting with the slag. The total quantity actually required is however not large, and in a specific case I have found 25 to 50 pounds of manganese dioxid, added to about 500 pounds of lime, to suffice for a six ton heat, sufficient fluorspar being added to render the slag fluid at the operating temperature. My invention is not limited however to these particular proportions; and much larger proportions of oxid may be used in those cases where it is desired to introduce larger amounts of metal into the bath in the reducing step about to be described.

The alloying metal is introduced into the bath in presence of this secondary slag. The slag not only prevents the absorption of carbon by the bath as already described, but may materially increase the efficiency of utilization of the expensive ferro-alloys, since as will readily be understood, the presence of the corresponding oxid in the slag tends to prevent oxidation of the alloying metal in its passage therethrough. Moreover, as explained below, any metal thus oxidized may be reduced back into the bath in the subsequent operating stage.

Following the introduction of the alloying metal or metals, I cut off the electric power and raise the electrodes sufficiently to prevent contact with or contamination of the bath. Thereupon I introduce into the slag a non-carbonaceous reducing agent such as silicon, ferrosilicon or aluminum, and thereby reduce the oxid components of the slag, either completely or to any desired degree. In this way a substantially complete recovery of the alloying metals is rendered possible, and as already pointed out the composition of the alloy may be modified as desired at this point by the introduction of appropriate oxids into the slag and their subsequent reduction.

This procedure not only prevents absorption of carbon by the bath during the alloying stage, but may under favorable conditions actually bring about some further elimination of carbon, by a further refining action of the secondary oxidizing slag. The method is therefore applicable in a measure to controlling the carbon content of these ferro-alloys in the range below 0.1 percent, which range could not be attained, at least with certainty and precision, under the prior practice.

My process in its preferred embodiment thus comprises at least three operating steps or stages, which may be briefly defined as follows:

(1) Refining the bath by the use of oxidizing slags as in the present practice, or by any other approved method.

(2) Replacement of the impure oxidizing slag by a basic slag containing a reducible metal oxid in proportion at least sufficient to oxidize the carbon vapors emanating from the arc; and the introduction of the alloying metal or metals in presence of this slag.

(3) Establishment of reducing conditions in this secondary slag to recover its oxid contents and to deoxidize the bath. This is carried out under conditions excluding contamination by carbon from the electrodes or other sources.

My invention is not limited however to the practice of all of these steps, since it is obvious, for example, that the low-carbon alloy resulting from the practice of the second step might be deoxidized by methods other than that constituting the third operating step; and also that the second operating step is applicable broadly for the introduction of alloying metals into baths, whenever it is desired to utilize the carbon arc furnace while avoiding or minimizing the absorption of carbon.

I claim:

1. Process of preparing low-carbon alloys, comprising supplying heat to a metal bath by means of a carbon arc, and introducing alloying components into the bath while preventing absorption of carbon therein by means of an oxidizing slag.

2. Process of preparing low-carbon alloys, comprising supplying heat to a metal bath by means of a carbon arc, and introducing alloying components into the bath while preventing absorption of carbon therein by means of a basic slag containing a reducible oxid capable of preventing the formation of carbids.

3. Process of preparing low-carbon alloys, comprising supplying heat to a metal bath by means of a carbon arc, and introducing alloying components into the bath while preventing absorption of carbon therein by means of a slag containing lime and an oxygen compound of a more readily reducible metal, whereby the formation of calcium carbid is prevented.

4. Process of preparing low-carbon alloys, comprising supplying heat to a metal bath by means of a carbon arc, and introducing alloying components into the bath while preventing absorption of carbon therein by means of an oxidizing slag; and thereafter imparting a reducing character to the slag by means of a non-carbon reducing agent.

5. Process according to claim 1, in which an oxid of an alloying component is introduced into the slag.

6. Process according to claim 1, in which manganese dioxid is used to impart an oxidizing character to the slag.

7. Process according to claim 4, in which deoxidation of bath and recovery of the metal values from the slag are effected by means of a silicon-containing reducing agent.

8. Process according to claim 4, in which an oxid of an alloying component is introduced into the slag, and thereafter recovered by means of a non-carbon reducing agent.

9. Process of making rustless iron, comprising heating a low-carbon iron bath by means of a carbon arc, and introducing chromium into the bath while preventing absorption of carbon therein by means of an oxidizing slag.

10. Process of making rustless iron comprising heating a low-carbon iron bath by means of a carbon arc, and introducing chromium into the bath while preventing absorption of carbon therein by means of a basic slag containing a reducible oxid capable of preventing the formation of carbids.

11. Process of making rustless iron, comprising heating a low-carbon iron bath by means of a carbon arc, and introducing chromium into the bath while preventing absorption of carbon therein by means of a slag containing lime and an oxygen compound of a more readily reducible metal, whereby the formation of calcium carbid is prevented.

12. Process of making rustless iron comprising heating an iron bath by means of a carbon arc, and introducing chromium into the bath while preventing absorption of carbon therein by means of a slag containing lime and an oxygen compound of a more readily reducible metal, whereby the formation of calcium carbid is prevented; and thereafter imparting a reducing character to the slag by means of a non-carbon reducing agent, thereby deoxidizing the bath and recovering metal values from the slag.

13. Process of making rustless iron comprising heating an iron bath by means of a carbon arc, and introducing chromium into the bath while preventing absorption of carbon therein by means of a slag containing lime and an oxygen compound of a more readily reducible metal, whereby the formation of calcium carbid is prevented; and thereafter discontinuing the application of electric power and imparting a reducing character to the slag by means of a non-carbon reducing agent, thereby deoxidizing the bath and recovering metal values from the slag.

14. Process according to claim 12, in which a reducing character is imparted to the slag by means of a silicon-containing reducing agent.

In testimony whereof, I affix my signature.

VERE B. BROWNE.